(12) United States Patent
Verbeke et al.

(10) Patent No.: US 11,878,714 B2
(45) Date of Patent: Jan. 23, 2024

(54) TECHNIQUES FOR CUSTOMIZING SELF-DRIVING MODELS

(71) Applicant: HARMAN INTERNATIONAL INDUSTRIES, INCORPORATED, Stamford, CT (US)

(72) Inventors: Joseph Verbeke, San Francisco, CA (US); Sven Kratz, Saratoga, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 163 days.

(21) Appl. No.: 16/841,621

(22) Filed: Apr. 6, 2020

(65) Prior Publication Data

US 2021/0309253 A1  Oct. 7, 2021

(51) Int. Cl.
*B60W 60/00* (2020.01)
*B63B 79/40* (2020.01)
(Continued)

(52) U.S. Cl.
CPC ........ *B60W 60/0013* (2020.02); *B60W 40/08* (2013.01); *B63B 79/40* (2020.01); *B63G 8/001* (2013.01); *B64C 39/024* (2013.01); *B64G 1/24* (2013.01); *G05B 13/0265* (2013.01); *B60W 2300/10* (2013.01); *B60W 2300/17* (2013.01);
(Continued)

(58) Field of Classification Search
CPC ............. B60W 60/0013; B60W 40/08; B60W 2540/225; B60W 2300/10; B60W 2300/17; B60W 2300/36; B60W 2420/42; B60W 2520/06; B60W 2520/12; B60W 2540/12; B60W 2540/22; B63B 79/40; B63G 8/001; B63G 2008/004; B64C 39/024; B64G 1/24; B64G 2001/247; G05B 13/0265

See application file for complete search history.

(56) References Cited

U.S. PATENT DOCUMENTS 10,399,575 B2  9/2019  Spasojevic et al.
10,655,978 B2  5/2020  Marti et al.
(Continued)

FOREIGN PATENT DOCUMENTS

WO   2018/100619 A1   6/2018

*Primary Examiner* — Dale W Hilgendorf
*Assistant Examiner* — Hana Lee
(74) *Attorney, Agent, or Firm* — Artegis Law Group, LLP (57) ABSTRACT

In various embodiments, while a self-driving model operates a vehicle, a user monitoring subsystem acquires sensor data associated with a user of the vehicle and a vehicle observation subsystem acquires sensor data associated with the vehicle. The user monitoring subsystem computes values for a psychological metric based on the sensor data associated with the user. Based on the values for the psychological metric, a feedback application determines a description of the user over a first time period. The feedback application generates a dataset based on the description and the sensor data associated with the vehicle. Subsequently, a training application performs machine learning operation(s) on the self-driving model based on the dataset to generate a modified self-driving model. Advantageously, the dataset enables the training application to automatically modify the self-driving model to account for the impact different driving actions have on the user.

19 Claims, 3 Drawing Sheets

(51) Int. Cl.

| | |
|---|---|
| *B60W 40/08* | (2012.01) |
| *B63G 8/00* | (2006.01) |
| *B64C 39/02* | (2023.01) |
| *B64G 1/24* | (2006.01) |
| *G05B 13/02* | (2006.01) |

(52) U.S. Cl.
    CPC ..... *B60W 2300/36* (2013.01); *B60W 2420/42* (2013.01); *B60W 2520/06* (2013.01); *B60W 2520/12* (2013.01); *B60W 2540/12* (2013.01); *B60W 2540/22* (2013.01); *B60W 2540/225* (2020.02); *B63G 2008/004* (2013.01); *B64G 1/247* (2023.08)

(56) References Cited

U.S. PATENT DOCUMENTS

| | | | |
|---|---|---|---|
| 10,850,746 | B2 | 12/2020 | Marti et al. |
| 11,312,389 | B2 * | 4/2022 | Imaizumi ............... B60W 50/14 |
| 2018/0009442 | A1 * | 1/2018 | Spasojevic ........... A61B 5/4064 |
| 2018/0174457 | A1 * | 6/2018 | Taylor ............... G08G 1/096741 |
| 2018/0281812 | A1 * | 10/2018 | Tochioka ............ B60W 30/025 |
| 2019/0049957 | A1 | 2/2019 | Healey et al. |
| 2019/0232974 | A1 * | 8/2019 | Reiley ............... B60W 60/0013 |
| 2020/0000392 | A1 * | 1/2020 | Nashida ............. G01C 21/3641 |
| 2020/0130705 | A1 * | 4/2020 | Boss .................... B60W 50/14 |
| 2020/0242421 | A1 * | 7/2020 | Sobhany ............... G06K 9/6292 |
| 2021/0221404 | A1 * | 7/2021 | Reiner ................. B60W 40/08 |
| 2021/0237714 | A1 * | 8/2021 | Hewitt .............. B60W 60/0013 |

\* cited by examiner

TECHNIQUES FOR CUSTOMIZING SELF-DRIVING MODELS

BACKGROUND

Field of the Various Embodiments

The various embodiments relate generally to computer science and automotive systems and, more specifically, to techniques for customizing self-driving models.

Description of the Related Art

Some vehicles include self-driving systems that make and implement driving decisions for the driver with little or no input from the driver. In a typical self-driving system, a variety of sensors monitor the environment surrounding the vehicle and the vehicle itself. Based on the resulting sensor data, a self-driving model makes driving decisions and causes the vehicle to implement the driving decisions via at least one control mechanism. The effect of a self-driving system is that the self-driving model drives the vehicle instead of the driver. Importantly, self-driving models can improve overall driving safety and the overall driving experience. For example, self-driving models can improve driving safety when a driver is inexperienced or distracted by reducing the number of driving mistakes and accidents caused by human error. However, in order for self-driving models to improve driving safety, the drivers have to actually use the self-driving models.

Currently, many drivers do not use self-driving models, even when available, because the drivers do not trust the ability of self-driving models to make appropriate driving decisions. In particular, because self-driving models do not usually take into account how different driving actions affect users (e.g., drivers and passengers), self-driving models can repeatedly make certain types of driving decisions that discourage some users from using self-driving models. For example, if a self-driving model repeatedly caused a vehicle to execute turns at high speeds that made a particular user feel uncomfortable or not in control, then the user could insist on manually driving the vehicle even under adverse conditions, such as when the user were tired, inebriated, etc.

To improve the overall performance of self-driving models, many providers of self-driving models periodically update or modify the self-driving models based on feedback received from users. For example, if a provider of a self-driving model were to receive feedback indicating that the self-driving model routinely caused vehicles to execute turns at high speeds that made users feel uncomfortable or not in control, then the provider could modify the self-driving model to ensure that turns are navigated within a more acceptable range of speeds One drawback of modifying a self-driving model based on feedback from users is that collecting the user feedback and modifying the self-driving model based on that feedback can take a long time. Meanwhile, in the interim period, some users could decide to stop using the self-driving model altogether, and, in more extreme cases, some users could even become opponents of the movement towards self-driving vehicles. Another drawback of modifying a self-driving model based on feedback from users is that usually only a subset of users provides feedback and the preferences of other users and potential users may not be considered when the provider modifies the self-driving model. Furthermore, different users typically have different driving styles, different driving preferences, and so forth. Because modifications to the self-driving model usually reflect average driving styles and preferences instead of personalized driving styles and preferences, the modifications may actually decrease the perceived performance of the self-driving model for some users.

As the foregoing illustrates, what is needed in the art are more effective techniques for implementing self-driving models.

SUMMARY

One embodiment sets forth a computer-implemented method for modifying a self-driving model based on data associated with at least one user of a vehicle. The method includes computing at least one value for a psychological metric based on first sensor data that is associated with a user of the vehicle and is acquired while the self-driving model operates the vehicle; determining a description of the user over a first time period based on the at least one value for the psychological metric; generating a first dataset based on the description and second sensor data that is associated with the vehicle and is acquired over the first time period; and performing at least one machine learning operation on the self-driving model based on the first dataset to generate a modified self-driving model.

At least one technical advantage of the disclosed techniques relative to the prior art is that the disclosed techniques use measured physiological data to automatically modify self-driving models to account for the impact different driving actions have on users. In particular, with the disclosed techniques, self-driving models can be efficiently re-trained to disfavor driving actions that are likely to have negative psychological impacts on users. Furthermore, the disclosed techniques enable self-driving models to be personalized to account for different user preferences and can therefore increase overall trust in self-driving systems across a wide variety of users. These technical advantages provide at least one technological advancement over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced at least one of these specific details.

System Overview

Figure 1:
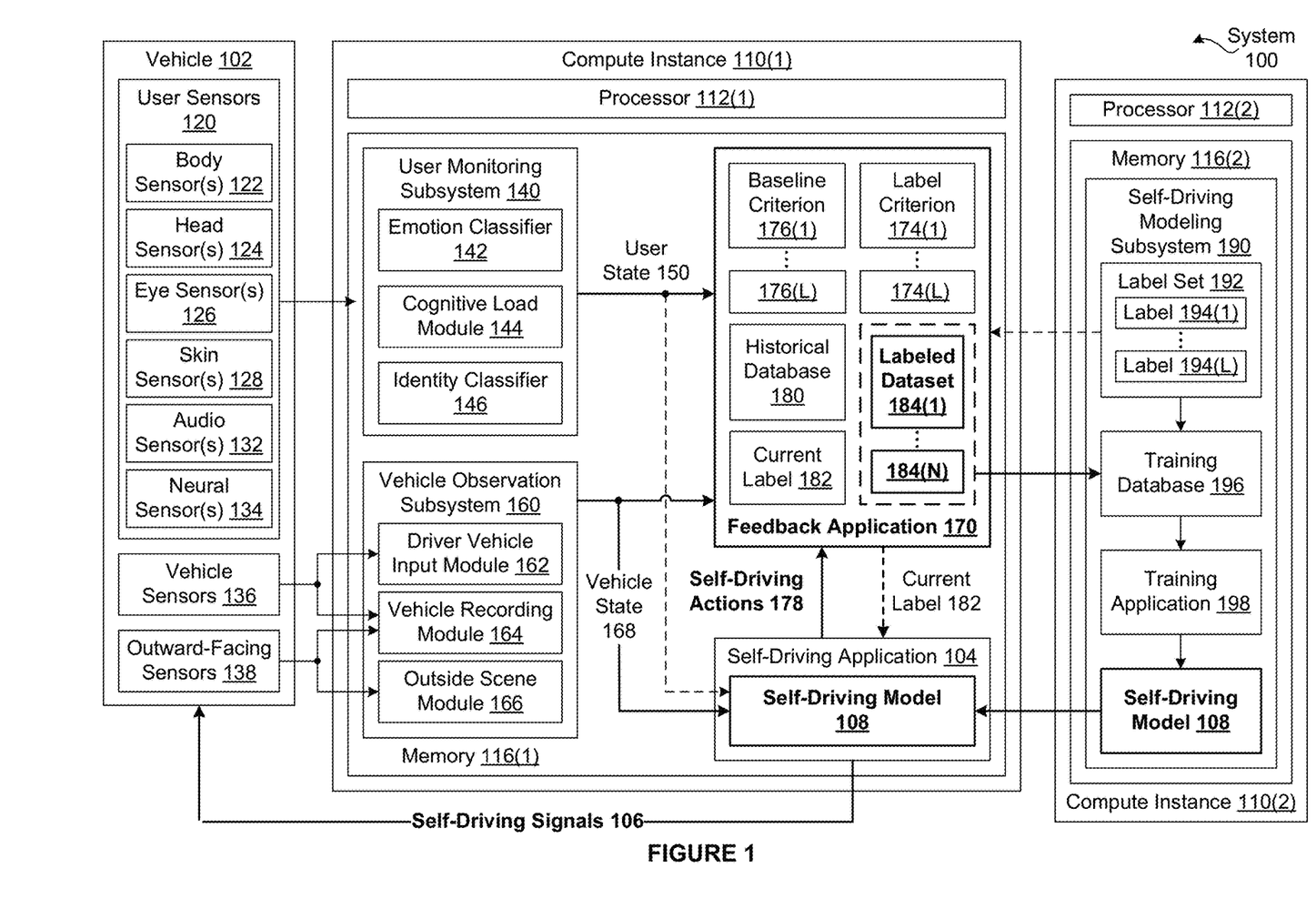
FIG. 1 is a conceptual illustration of a system configured to implement at least one aspect of the various embodiments.

FIG. 1 is a conceptual illustration of a system 100 configured to implement at least one aspect of the various embodiments. The system 100 includes, without limitation, a vehicle 102, and compute instances 110. For explanatory purposes, multiple instances of like objects are denoted with reference alphanumeric characters identifying the object and parenthetical alphanumeric characters identifying the instance where needed.

In alternate embodiments, the system 100 may include any number of compute instances 110, any number of vehicles 102, and any number of additional components (e.g., applications, subsystems, modules, etc.) in any combination. Any number of the components of the system 100 may be distributed across multiple geographic locations or implemented in at least one cloud computing environment (i.e., encapsulated shared resources, software, data, etc.) in any combination.

The vehicle 102 may be any type of ground-based or non-ground-based machine that transports at least one human occupant. For instance, the vehicle 102 may be, among other things, a car, a motorcycle, a sport utility vehicle, a truck, a bus, an all-terrain vehicle, a snowmobile, a commercial construction machine (e.g., a crane, an excavator, etc.), an airplane, a helicopter, a boat, a submarine, an electric vertical takeoff and landing vehicle, or a spaceship. Furthermore, the vehicle 102 may be a taxi, an Uber vehicle, a Lyft vehicle, etc. The vehicle is occupied by a person who sits in the driver seat and is referred to herein as "driver" and any number of other persons who sit in passenger seats and are referred to herein as passengers. The driver and all such other persons that occupy the vehicle 102 are referred to herein as "users."

As shown, each of the compute instances 110 includes, without limitation, a processor 112 and a memory 116. The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be at least one of a readily available memory, such as random-access memory, read-only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

Each of the compute instances 110 is configured to implement at least one software application or subsystems of software applications. For explanatory purposes only, each software application is depicted as residing in the memory 116 of a single compute instance 110 and executing on the processor 112 of the single compute instance 110. However, in alternate embodiments, the functionality of each software application may be distributed across any number of other software applications that reside in the memories 116 of any number of compute instances 110 and execute on the processors 112 of any number of compute instances 110 in any combination. Further, the functionality of any number of software applications or subsystems may be consolidated into a single software application or subsystem.

More specifically, the compute instances 110 are configured to implement a self-driving model 108 that operates the vehicle 102 with little or no human intervention when the vehicle 102 is in a self-driving mode. As described previously herein, in one conventional approach to improving the performance of a self-driving model, a provider periodically modifies the self-driving model based on feedback received from users. One drawback of relying on feedback received from users is that collecting the user feedback can take a long time. Furthermore, the modifications to the conventional self-driving model typically reflect average driving styles and preferences for the subset of users who manually provide feedback. As a result, the modifications may actually decrease the perceived performance of the self-driving model for users that have atypical driving styles and preferences.

Customizing the Self-Driving Model for the Users

To more efficiently and reliably increase the quality of the driving experience as perceived by the users, the compute instances 110 are configured to implement, without limitation, a self-driving modeling subsystem 190 and a feedback application 170. As described in detail below, the self-driving modeling subsystem 190 generates the self-driving model 108 that operates the vehicle 102 while the vehicle 102 is in the self-driving mode. As the vehicle 102 operates, the feedback application 170 automatically evaluates the mental states of the users to generate feedback that enables the self-driving modeling subsystem 190 to generate a new self-driving model 108 that is better aligned with the driving styles and preferences of the users. For example, the feedback application 170 could generate feedback indicating that the users became agitated when the self-driving model 108 caused the vehicle 102 to execute a left turn during an eight second gap in the oncoming traffic. The self-driving modeling subsystem 190 could then use the feedback to generate a new self-driving model 108 that does not initiate a left turn unless there is at least a nine second gap in oncoming traffic.

Note that the techniques described herein are illustrative rather than restrictive and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

Notably, and for explanatory purposes only, the system 100 is described in the context of the self-driving model 108 that is a machine learning model trained by the self-driving modeling subsystem 190. The self-driving modeling subsystem 190 uses the feedback generated by the feedback application 170 to re-train the self-driving model 108, thereby improving the performance of the self-driving model 108 as perceived by the users. In alternate embodiments, the self-driving model 108 may implement any number and type of algorithms (e.g., heuristics, rules, etc.) and the self-driving modeling subsystem 190 may modify the algorithms based on any type of feedback generated by the feedback application 170 in any technically feasible fashion.

To enable the self-driving model 108 to safely maneuver the vehicle 102 and the feedback application 170 to evaluate the users, the vehicle 102 includes, without limitation, vehicle sensors 136, outward-facing sensors 138, and user sensors 120. The vehicle sensors 136, the outward-facing sensors 138, and the user sensors 120 may be distributed across any number of locations. For instance, in some embodiments, each of the user sensors 120 is attached to the vehicle 102 (e.g., built into a steering wheel, headrest, etc.) or worn by a user of the vehicle 102.

Although not shown, the vehicle 102 additionally includes, without limitation, any number of primary vehicle components that can be used to operate the vehicle 102. Some examples of primary vehicle components include, without limitation, a braking system, a powertrain, a transmission, a steering system, and a headlight control system. In at least one embodiment, the vehicle 102 may also include, without limitation, any number and type of secondary vehicle components that can be used to monitor the primary driving task and/or perform any number of secondary tasks. For example, the vehicle 102 could include, without limitation, am instrument cluster (e.g., a temperature control subsystem, an analog speedometer, a digital dashboard, etc.) and a head unit that interfaces to an infotainment system and a navigation system.

The vehicle sensors 136 and the outward-facing sensors 138 monitor the vehicle 102 itself and the area surrounding the vehicle 102, respectively, in real-time. As the vehicle 102 operates, a vehicle observation subsystem 160 processes signals received from the vehicle sensors 136 and the outward-facing sensors 138 to generate a vehicle state 168. The vehicle observation subsystem 160 resides in the memory 116(1) of the compute instance 110(1) and executes on the processor 112(1) of the compute instance 110(1). In at least one alternate embodiment, the vehicle observation subsystem 160 is implemented in a compute instance 110 that is included in the vehicle 102.

As shown, the vehicle observation subsystem 160 includes, without limitation, a driver vehicle input module 162, a vehicle recording module 164, and an outside scene module 166. The driver vehicle input module 162 processes sensor signals received from any number of the vehicle sensors 136 to generate driver input data (not shown) that is included in the vehicle state 168. The driver input data specifies inputs determined by a driver while the vehicle 102 is not operating in the self-driving mode, such as the current steering wheel angle, the accelerator pedal position, the brake pedal position, and so forth.

The vehicle recording module 164 processes sensor signals received from any number of the vehicle sensors 136 and any number of the outward-facing sensors 138 to generate vehicle telemetry data (not shown) that is included in the vehicle state 168. The vehicle telemetry data specifies characteristics of the vehicle 102, such as the speed, lateral acceleration, direction, position, engine revolutions per minute ("RPM"), battery charge state, and so forth.

The outside scene module 166 processes sensor signals received from any number of the outward-facing sensors 138 (e.g., a forward-facing camera that is mounted on the vehicle 102, a light detection and ranging sensor, etc.) to generate environmental data (not shown) that is included in the vehicle state 168. The outside scene module 166 may perform any number and type of operations (e.g., tracking operations) on the sensor signals in any technically feasible fashion to generate any amount and type of environmental data.

For instance, in at least one embodiment, the outside scene module 166 includes, without limitation, a segmentation and classification machine learning model. The outside scene module 166 inputs exterior scene images received via the sensor signals into the segmentation and classification model. In response, the segmentation and classification model segments regions in the exterior scene images, classifies the regions into types (e.g., road, vehicle, road sign, pedestrian, etc.), tracks the movement of the classified regions over time, and outputs tracking data (not shown). As the segmentation and classification model generates the tracking data, the outside scene module 166 adds the tracking data to the environmental data.

Each of the driver vehicle input module 162, the vehicle recording module 164, and the outside scene module 166 operates continuously and automatically. As a result, the vehicle observation subsystem 160 updates the vehicle state 168 in real-time. In alternate embodiments, any number of components included in the vehicle observation subsystem 160 may generate corresponding portions of the vehicle state 168 based on any type of trigger (e.g., every ten seconds), and each component may be associated with a different trigger.

As shown, the user sensors 120 include, without limitation, body sensor(s) 122, head sensor(s) 124, eye sensor(s) 126, skin sensor(s) 128, audio sensor(s) 132, and neural sensor(s) 134. Each of the user sensors 120 is configured to detect and relay physiological data (e.g., measurements) associated with any number of the users of the vehicle 102 in real-time. In alternate embodiments, the user sensors 120 may include, without limitation, any number and type of devices that detect and relay any quantifiable aspect of a human being in any technically feasible fashion.

The body sensor(s) 122 include, without limitation, any number and combination of optical sensors via which the gesticulation and/or posture of a human being can be determined, musculature sensors via which the muscle contractions of a human being can be determined, breathing sensors via which the breathing rate of a human being can be determined, heart rate sensors via which of electrocardiogram readings of a human being can be determined, weight sensors during which the weight distribution of any number of human beings can be determined, or any other technically feasible type of physiological sensor via which any quantifiable aspects of the body of a human being (e.g., a body position, a body orientation, etc.) can be determined.

The head sensor(s) 124 include, without limitation, any number and combination of optical sensors, magnetic sensors, blood flow sensors, muscle contraction sensors, thermal sensors, radar sensors, and any other technically feasible type of physiological sensor via which the position and/or orientation of the head of a human being (i.e., a head position and/or a head orientation, respectively) can be determined. The eye sensor(s) 126 include, without limitation, any number and combination of an eye gaze direction module, a vergence sensor, a pupillometry sensor, an optical depth sensor, or any other technically feasible type of physiological sensor via which the gaze direction and/or eye convergence distance of a human being can be determined. The skin sensor(s) 128 include, without limitation, any number and combination of a galvanic skin response sensor, a skin conduction sensor, a skin texture sensor, or any other technically feasible type of physiological sensor via which at least one attribute of the skin of a human being (e.g., a skin conductivity) can be quantified.

The audio sensor(s) 132 include, without limitation, any number and type of a microphone, microphone array, or any other technically feasible type of sensor via which words and sounds associated with a human being can be determined. The neural sensor(s) 134 include, without limitation, any number and combination of a neural activity measurement device (e.g., an electroencephalogram sensor), a functional magnetic resonance imaging unit, an optogenetics module, or any other technically feasible type of physiological sensor via which any form of human neural activity can be quantified.

As the vehicle 102 operates, a user monitoring subsystem 140 acquires sensor data from the user sensors 120 and processes the sensor data to generate a user state 150. The user state 150 includes, without limitation, any amount and type of emotional data, any amount and type of cognitive load data, and any amount and type of identification data associated with any number of the users. The user monitoring subsystem 140 resides in the memory 116(1) of the compute instance 110(1) and executes on the processor 112(1) of the compute instance 110(1). In at least one alternate embodiment, the user monitoring subsystem 140 is implemented in a compute instance 110 that is included in the vehicle 102.

As shown, the user monitoring subsystem 140 includes, without limitation, an emotion classifier 142, a cognitive load module 144, and an identify classifier 146. The emotion classifier 142 generates the emotional data included in the user state 150 based on any amount and type of sensor data received from any number of the user sensors 120. The emotional data specifies the emotion of any number of the users as expressed via any type of physiological cues (e.g., visual cues, audio cues, etc.) along any number of emotional dimensions. For instance, in some embodiments, the visual emotion classification includes, without limitation, a discrete emotion classification that specifies emotions such as surprise, joy, fear, sadness, anger, distrust, etc. In the same or other embodiments, the visual emotion classification includes, without limitation, values for a two-dimensional parametrized emotion metric or a three-dimensional parameterized emotion metric. For example, the visual emotion classification could include values for a two-dimensional parametrized emotion metric having the dimensions of valence and arousal or a three-dimensional parameterized emotion having the dimensions of valence, arousal, and dominance.

The emotion classifier 142 may determine the emotional data in any technically feasible fashion. For instance, in at least one embodiment, the emotion classifier 142 includes, without limitation, a machine learning model that is trained to use any number and/or combination of visible light camera images, infrared light camera images, and/or thermal images of the face of the driver to determine a corresponding visual emotion classification. In the same or other embodiments, the emotion classifier 142 includes, without limitation, a machine learning model that is trained to use the speech of a human being to determine a corresponding auditory emotion classification.

The cognitive load module 144 generates the cognitive load data included in the user state 150 based on any amount and type of sensor data received from the user sensors 120. The cognitive load data includes, without limitation, the cognitive loads of any number of the users. As referred to herein, the cognitive load of a user at a given point in time correlates to the total amount of mental activity imposed on the user and is an indication of how hard the user is concentrating. The cognitive load data may specify the cognitive load in any technically feasible fashion and at any level of granularity. For instance, in at least one embodiment, the cognitive load data includes, without limitation, one of three values (low, medium, or high) of a cognitive load metric for each of the users.

The cognitive load module 144 may determine the cognitive load data in any technically feasible fashion. For instance, in some embodiments, the cognitive load module 144 may determine the cognitive load data based on sensor data that specifies, without limitation, any number of brain activity, heart rate, skin conductance, steering-wheel grip force, muscle activity, skin/body temperature, and so forth. In the same or other embodiments, the cognitive load module 144 includes, without limitation, a machine learning model that is trained to estimate a pupil-based metric that reflects the cognitive load of a human being based on the sizes and/or levels of reactivity of the pupils of the human being. The cognitive load module 144 may measure the sizes and/or levels of reactivity of the pupils in any technically feasible fashion. For instance, in some embodiments, the cognitive load module 144 may measure the sizes and/or levels of reactivity of the pupils directly based on pupil information obtained via infrared camera images. In the same or other embodiments, the cognitive load module 144 may measure the sizes and/or levels of reactivity of the pupils indirectly using deep-learning eye movement tracking based on visible light camera images. In some alternate embodiments, the cognitive load module 144 includes, without limitation, a cognitive load classifier (not shown) that generates a value for a cognitive load metric and/or a value for a stress metric based on eye motion data. The eye motion data may include, without limitation, the eye gaze direction. and/or derivatives of eye gaze data patterns in the temporal direction, such as eye saccades and eye fixations, and/or any number and/or types of other derivates of the eye motion data.

In at least one alternate embodiment, the cognitive load module 144 may determine the cognitive load data based, at least in part, on audio data received from any number of microphones included in the user sensors 120. For instance, the cognitive load module 144 may implement any number of algorithms that analyze the audio data to detect conversational context, conversational turn taking, voice tone and affect, auditory distractions, and the like. For example, and without limitation, the cognitive load module 144 could detect that two of the users are engaged in conversation, determine that one of the users is drowsy based on the tone of the user, and so forth.

The identity classifier 146 generates the identification data included in the user state 150 based on any amount and type of sensor data received from the user sensors 120. The identification data may specify any amount and type of data (e.g., classifications) that identifies and/or classifies any number of the users at any level of granularity. For example, for each user, the identification data could specify a person, a group of people, or a characteristic that identifies the user or a group to which the user belongs. The identity classifier 146 may compute the identification data in any technically feasible fashion. For instance, in at least one embodiment, the identity classifier 146 includes, without limitation, a machine learning model that is trained to estimate an identification classification for a human being. In at least one other embodiment, the identity classifier 146 implements any number and type of heuristics to estimate an identification classification for each user.

In at least one alternate embodiment, the identity classifier 146 determines the identity classification based on the sensor data received from the user sensors 120 in conjunction with additional information associated with the users and/or the vehicle 102. For instance, in some alternate embodiments, the identity classifier 146 receives driver vehicle input data generated by the driver vehicle input module 162. The identity classifier 146 analyzes the driver vehicle input data to generate at least one behavioral characterization for the actions of the associated user. The identity classifier 146 then determines the identification data for the user based on the behavior characterization(s) in conjunction with the sensor data received from the user sensors 120.

Each of the emotion classifier 142, the cognitive load module 144, and the identify classifier 146 operates continuously and automatically. As a result, the user monitoring subsystem 140 updates the user state 150 in real-time. In alternate embodiments, any number of components included in the user monitoring subsystem 140 may generate corresponding portions of the user state 150 based on any type of trigger (e.g., every ten seconds), and each component may be associated with a different trigger.

In at least one alternate embodiment, the user state 150 may include, without limitation, any number of values for any number of psychological metrics instead of or in addition to the emotional data, the cognitive load data, and the identification data. As referred to herein, a "psychological metric" is any type of measurement of any emotional aspect, cognitive aspect, or other mental aspect of a human being. In the same or other alternate embodiments, the user state 150 may include, without limitation, collective data or average data instead of or in addition to per-user data. For instance, in at least one alternate embodiment, the user state 150 may include, without limitation, an average cognitive load and an average emotional load. In at least one alternate embodiment, the user state 150 may represent a subset of the users (e.g., the users sitting in the front seats).

A self-driving application 104 enables the vehicle 102 to operate in the self-driving mode. The self-driving mode may be activated in any technically feasible fashion. In at least one embodiment, the self-driving mode may be activated via a remote control that is associated with the vehicle 102. In the same or other embodiments, the self-driving mode may be activated via a control mounted on the steering wheel of the vehicle 102 or the dashboard of the vehicle 012. In at least one embodiment, the self-driving application 104 resides in the memory 116(1) of the compute instance 110(1) and executes on the processor 112(1) of the compute instance 110(1). In at least one alternate embodiment, the self-driving application 104 is implemented in a compute instance 110 that is included in the vehicle 102.

As shown, the self-driving application 104 includes, without limitation, the self-driving model 108. When the self-driving mode is activated, the self-driving application 104 determines self-driving actions 178 based on the self-driving model 108 and transmits corresponding self-driving signals 106 in real-time to at least one component associated with the vehicle 102. The self-driving actions 178 specify any number of actions associated with performing at least a portion of the primary driving task, and the self-driving signals 106 control any number of operational aspects of the vehicle 102 to affect the self-driving actions 178.

In at least one embodiment, the self-driving signals 106 control, without limitation, at least one of the steering, the braking, the acceleration, the signals, or the headlights of the vehicle 102 at any given time. Each of the self-driving signals 106 may control any number of associated components of the vehicle 102 in any technically feasible fashion. For instance, in at least one embodiment, any number of the self-driving signals 106 are brake control signals, and the self-driving application 104 transmits the brake control signals to actuators that control the brakes of the vehicles 102.

The self-driving application 104 may determine the self-driving actions 178 and the self-driving signals 106 in any technically feasible fashion. In at least one embodiment, the self-driving application 104 receives the vehicle state 168 and inputs at least a portion of the vehicle state 168 into the self-driving model 108. In response, the self-driving model 108 outputs the self-driving actions 178. The self-driving application 104 then converts the self-driving actions 178 into corresponding self-driving signals 106 and transmits the self-driving signals 106 to at least one component associated with the vehicle 102. In at least one embodiment, the self-driving application 104 transmits the self-driving actions 178 to the feedback application 170.

As depicted with a dotted arrow, in at least one alternate embodiment, the self-driving model receives the user state 150 in addition to the vehicle state 168 and inputs at least a portion of the vehicle state 168 and at least a portion of the user state 150 into the self-driving model 108. In response, the self-driving model 108 outputs the self-driving actions 178. In at least one alternate embodiment, the self-driving application 104 may perform any number and type of preprocessing operations to generate inputs for the self-driving model 108 based, at least in part, on the vehicle state 168 and, optionally, the user state 150. In the same or other alternate embodiments, the self-driving application 104 may perform any number and type of postprocessing operations based, at least in part, on the output of the self-driving model 108 to generate the self-driving actions 178.

In at least one alternate embodiment, the self-driving application 104 may interact with any number (including none) of advanced driver assistance systems ("ADAS") features associated with the vehicle 102 *n* any technically feasible fashion. Each ADAS feature is intended to increase driving safety when the vehicle 102 is operating. Some examples of ADAS features include, without limitation, anti-lock braking, blind spot detection, collision avoidance, lane keeping assist, hill descent control, autonomous parking, etc.

Together, the self-driving application 104 and the self-driving model 108 may implement, without limitation, any number and type of algorithms based on the vehicle state 168 and, optionally, the user state 150 to generate the self-driving actions 178 and the corresponding self-driving signals 106. For instance, in at least one embodiment, each of the self-driving application 104 and the self-driving model 108 may implement, without limitation, any number and type of rules, any number and type of heuristics, and any number and type of machine learning techniques in any combination. In at least one alternate embodiment, the self-driving application 104 is omitted from the system 100 and the self-driving model 108 acquires input data directly from the vehicle observation subsystem 160 and, optionally, the user monitoring subsystem 140 and generates the self-driving actions 178 and/or the self-driving signals 106. In the same or other alternate embodiments, the self-driving model 108 transmits the self-driving actions 178 to the feedback application 170 and/or transmits the self-driving signals 106 to any number of the components of the vehicle 102.

In at least one embodiment, the self-driving application 104 acquires the self-driving model 108 from the self-driving modeling subsystem 190. The self-driving modeling subsystem 190 resides in the memory 116(2) of the compute instance 110(2) and executes on the processor 112(2) of the compute instance 110(2). In at least one embodiment, the compute instance 110(2) is included in a cloud computing environment or a distributed computing environment.

As shown, the self-driving modeling subsystem 190 includes, without limitation, a label set 192, a training database 196, a training application 198, and the self-driving model 108. The label set 192 includes, without limitation, labels 194(1)-194(L), where each of the labels 194 corresponds to a different psychological characterization of at least one user. In at least one embodiment, each of the labels 194 is also referred to herein as a "description" of at least one user. For instance, in some embodiments, the labels 194 may include, without limitation, "fearful," "frustrated," "high cognitive load," "joyful," and so forth. In alternate embodiments, the label set 192 may include, without limitation, a single label 194(1).

The training database 196 includes, without limitation, any number of labeled datasets 184 and is associated with any number of vehicles 102 and any number of users. Each labeled dataset 184 is associated with a different combination of time period and vehicle 102. For a given vehicle 102, each labeled dataset 184 includes, without limitation, one of the labels 194 that characterizes the users during the associated time period, the vehicle states 168 during the associated time period, and the self-driving actions 178 during the associated time period. For example, one of the labeled datasets 184 could include, without limitation, the vehicle states 168 indicating that the vehicle 102 performed a left turn during an eight second gap in the oncoming traffic, the self-driving actions 178 associated with the left turn, and the label 194 of fearful.

The training database 196 may be initially generated in any technically feasible fashion. For instance, the training database 196 may be manually or automatically generated based on any number of driving scenarios (not shown in FIG. 1) and default driving preferences instead of measured data associated with actual vehicle 102 and users. Some examples of driving preferences include, without limitation, preferences regarding a maximum speed, a maximum deceleration, a maximum acceleration, a minimum distance from other vehicles and objects, a minimum level of politeness to other road users, a minimum level of adherence to road rules, and so forth.

The training application 198 implements any number and type of machine learning operations to generate the self-driving model 108 based on the training database 196. To generate the initial self-driving model 108, the training application 198 trains any type of untrained machine learning model or incompletely trained machine learning model using the training database 196. The self-driving modeling subsystem 190 then provides (e.g., transmits, copies to a known location, etc.) the self-driving model 108 to at least one instance of the self-driving application 104.

As described in greater detail below, as the vehicle 102 operates, the feedback application 170 generates new labeled dataset(s) 184 and adds the new labeled dataset(s) 184 to the training database 196. Subsequently, based on any type of trigger (e.g., every day), the self-driving modeling subsystem 190 re-executes the training application 198. When the training application 198 is re-executed, the training application 198 re-trains the self-driving model 108 using the updated training database 196. The self-driving modeling subsystem 190 then provides (e.g., transmits, copies to a known location, etc.) the updated self-driving model 108 to the self-driving application 104 associated with the vehicle 102.

In at least one alternate embodiment, the self-driving application 104 may acquire an up-to-date self-driving model 108 at any point in time and in any technically feasible fashion. Accordingly, the performance of the self-driving model 108 as perceived by the users is incrementally improved over time. For example, the self-driving model 108 may become better aligned with the preferences of the users regarding a maximum speed, a maximum deceleration, a maximum acceleration, a minimum distance from other vehicles and objects, a minimum level of politeness to other road users, a minimum level of adherence to road rules, and so forth.

As persons skilled in the art will recognize, the techniques described herein may be used to modify any number of self-driving models 108 based on any number of vehicles 102 and any number of users to reflect any granularity of customization. For instance, in at least one embodiment, the system 100 includes, without limitation, a different self-driving model 108 for each of any number of vehicles 102. For each of the vehicles 102, an associated instance of the feedback application 170 generates new labeled datasets 184 that the training application 198 uses to re-train the associated self-driving model 108. As a result, each of the self-driving models 108 is iteratively and automatically customized over time to reflect the preferences of the users of a different vehicle 102. Similarly, in at least one alternate embodiment, the techniques described herein may be modified to iteratively and automatically customize a different self-driving model 108 for each user across any number of vehicles 102.

In at least one alternate embodiment, a single self-driving model 108 is associated with multiple vehicles 102. For each of the vehicles 102, an associated instance of the feedback application 170 generates new labeled datasets 184 and then adds the new labeled datasets 184 to a shared training database 196. The training application 198 uses the shared training database 196 to re-train the self-driving model 108. As a result, the self-driving model 108 is iteratively and automatically customized over time to reflect the collective preferences of the users across the vehicles 102.

As the vehicle 102 operates, the feedback application 170 generates new labeled dataset(s) 184 in real-time based on the vehicle states 168, the user states 150, the self-driving actions 178, and the label set 192. As described previously herein, each of the labeled datasets 184 includes, without limitation, one of the labels 194 that characterizes the users during an associated time period, the vehicle states 168 during the associated time period, and the self-driving actions 178 during the associated time period. Generating the labeled dataset 184 that includes, without limitation, the label 194 and any amount and/or type of data is also referred to herein as "labeling the data."

The feedback application 170 may generate the new labeled dataset(s) 184 in any technically feasible fashion. For instance, in at least one embodiment, the feedback application 170 includes, without limitation, label criteria 174(1)-174(L), baseline criteria 176(1)-176(L), a historical database 180, a current label 182, and the labeled datasets 184(1)-184(N). For explanatory purposes only, the label criterion 174(x) and the baseline criterion 176(x) correspond to the label 194(x), where x is an integer from 1 to L. In at least one alternate embodiment, the number of label criteria 174 and the number of baseline criteria 176 may differ from the number of labels 194 included in the label set 192. In the same or other alternate embodiments, the feedback application 170 generates a single labeled dataset 184.

The label criterion 174(x) specifies, without limitation, any number of conditions, rules, etc., that the feedback application 170 evaluates based on a current user state 150 to determine whether the label 194(x) is applicable to a surrounding time period. In a complimentary fashion, the baseline criterion 176(x) specifies, without limitation, any number of conditions, rules, etc., that the feedback application 170 evaluates based on previous user states 150 and subsequent user states 150 to define the surrounding time period.

Figure 2:
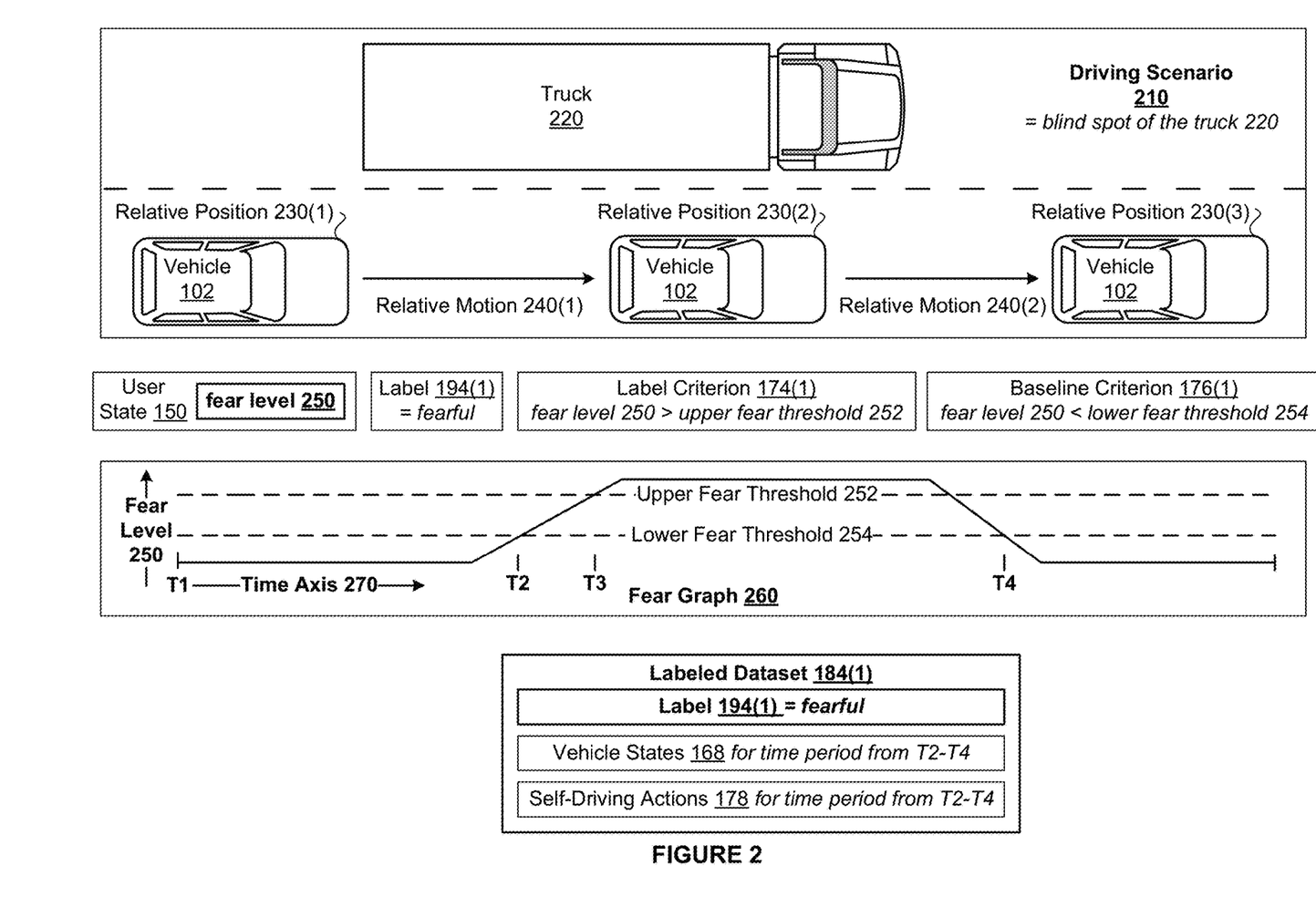
FIG. 2 is an exemplary labeled dataset generated by the feedback application of FIG. 1, according to various embodiments.

For instance, and as described in greater detail in conjunction with FIG. 2, in at least one embodiment, each of the user states 150 includes, without limitation, a fear level and the label 194(1) is equal to fearful. The label criterion 174(1) specifies that when the current fear level is greater than an upper fear threshold, the label 194(1) applies to a surrounding time period. The baseline criterion 176(1) specifies that the surrounding time period is bounded by the closest previous time at which the fear level is less than a lower fear threshold and the closest subsequent time at which the fear level is less than a lower fear threshold.

The feedback application 170 may determine the label criteria 174 and the baseline criteria 176 in any technically feasible fashion. For example, and without limitation. the label criteria 174 and the baseline criteria 176 may be hard-coded, provided via an application programming interface, or provided via graphical user interface, In alternate embodiments, the feedback application 170 may generate any number of the label criterion 174 and/or any number of the baseline criteria 176 dynamically based on any amount and type of historical data (e.g., the historical database 180). For example, the feedback application 170 may set the baseline criteria 176 for the label 194(1) of fearful equal to a moving average of a fear level.

The feedback application 170 may evaluate the label criteria 174 and the baseline criteria 176 in any technically feasible fashion. For instance, in at least one embodiment, the feedback application 170 sets the current label 182 equal to an empty label to initiate a new evaluation interaction. While the current label 182 is equal to the empty label, the feedback application 170 receives and stores the user states 150, the vehicle states 168, and the self-driving actions 178 in the historical database 180 in real-time.

Whenever the user state 150 changes while the current label 182 is equal to the empty label, the feedback application 170 performs any number and type of evaluation operations based on the label criteria 174 and the new user state 150 to determine whether any of the labels 194 applies to a surrounding time period. If the feedback application 170 determines that the label criteria 174(x) applies to a surrounding time period, then the feedback application 170 sets the current label 182 equal to the label 194(x) and generates a new labeled dataset 184 that includes, without limitation, the current label 182.

The feedback application 170 then performs any number and type of evaluation operations based on the baseline criterion 176(x) and the previous user states 150 stored in the historical database 180 to determine a start time. For the portion of the historical database 180 that is associated with times that lie between the start time and the current time, inclusive, the feedback application 170 copies the vehicle states 168 and the self-driving actions 178 to the new labeled dataset 184.

While the current label 182 is equal to one of the labels 194(x), the self-driving application 104 receives and adds the vehicle states 168 and the self-driving actions 178 to the associated labeled dataset 184. Whenever the user state 150 changes while the current label 182 is equal to the label 194(x), the feedback application 170 performs any number and type of evaluation operations based on the baseline criterion 176(x) and the user state 150 to determine whether the current label 182 is still applicable.

If the feedback application 170 determines that the current label 182 is no longer applicable, then the feedback application 170 adds the new labeled dataset 184 to the training database 196. The feedback application 170 may add the new labeled dataset 184 to the training database 196 in any technically feasible fashion. The feedback application 170 then sets the current label 182 equal to the empty label to initiate a new evaluation iteration. The feedback application 170 continues to execute new evaluation iterations and therefore generate new labeled datasets 184 until the vehicle 102 ceases to operate or the feedback application 170 is terminated (e.g., via an exit command, etc.).

In alternate embodiments, the feedback application 170 may add each of the new labeled dataset(s) 184 to the training database 196 at any given time. For instance, in at least one alternate embodiment, the feedback application 170 stores the new labeled datasets 184 until the vehicle 102 ceases to operate or the feedback application 170 is terminated (e.g., via an exit command, etc.). The feedback application 170 then transmits the new labeled datasets 184 to the training database 196.

As depicted with a dashed line, in at least one alternate embodiment, when the self-driving application 104 updates the current label 182, the self-driving application 104 also transmits the current label 182 to the self-driving application 104. In the same or other alternative embodiments, the current label 182 or data derived from the current label 182 is an input to the self-driving model 108. In at least one alternate embodiment, the self-driving application 104 may perform any number and type of preprocessing operations and/or postprocessing operations based on the current label 182 and any amount and type of additional data.

Advantageously, taking into account the current label 182 when determining the self-driving actions 178 enables the self-driving application 104 to dynamically adapt the driving style based on the psychological states of the users. For example, if the user(s) enter the car while in relatively relaxed states, then the feedback application 170 could set the current label 182 to the label 194 of "relaxed." In response, the self-driving model 192 could select self-driving actions 178 that reflect a relatively gentle driving style. In another example, if the user(s) enter the car while in relatively stressed states and an associated calendar indicates the user(s) are late for a dinner reservation, then the self-driving application 104 could select self-driving actions 178 that reflect a relatively aggressive driving style to reduce the time required to reach the restaurant.

In at least one alternate embodiment, before adding a new labeled dataset 184 to the training database 196, the feedback application 170 may interact with at least one of the users in any technically feasible fashion in an attempt to confirm and/or improve an initial description specified via the current label 182. For example, suppose that the labeled dataset 184 included, without limitation, the label 194(1) of fearful based on the portion of the user state 150 associated with the user named Ava and the self-driving actions 178 associated with a right turn. In at least one alternate embodiment, the feedback application 170 could cause a speaker system included in the vehicle 102 to ask the question "Ava, should I take that right turn slower next time?" Based on the verbal response from Ava, the self-driving application 104 could update the label 194(1) specifying the initial description to a more accurate label 194, such as "exhilarated" specifying an improved description.

In the same or other alternate embodiments, the self-driving application 104 may add any amount and type of information to the training database 196 or a preference dataset (not shown) based on interactions with the users, For example, the self-driving application 104 could update a preference dataset to indicate that Ava would like the vehicle 102 to execute a specific right turn or right turns in general at a slower speed. The self-driving application 104 and/or the self-driving model 108 may take the preference dataset into account when determining the self-driving actions 178 in any technically feasible fashion.

It will be appreciated that the system shown herein is illustrative and that variations and modifications are possible. The connection topology, including the location and arrangement of the vehicle 102, the compute instances 110, the user monitoring subsystem 140, the vehicle observation subsystem 160, the feedback application 170, the self-driving application 104, the self-driving model 108, and the self-driving modeling subsystem 190 may be modified as desired. In certain embodiments, at least one component shown in FIG. 1 may not be present. For instance, in some alternate embodiments, any amount of the functionality of the user monitoring subsystem 140 and/or the vehicle observation subsystem 160 may be subsumed into the feedback application 170.

Note that the techniques described herein are illustrative rather than restrictive and may be altered without departing from the broader spirit and scope of the embodiments. In at least one embodiment, any number of the techniques disclosed herein may be implemented while other techniques may be omitted in any technically feasible fashion. Further, many modifications and variations will be apparent to those of ordinary skill in the art without departing from the scope and spirit of the described embodiments and techniques and the techniques described herein are modified accordingly. For instance, in at least one embodiment, the labeled datasets 184 may include any amount and type of data derived based, at least in part, on any amount and type of sensor data, any portion (including none) of the vehicle state 168, any portion (including none) of the user state 150, any number (including none) of the self-driving actions 178, and/or any amount (including none) of additional data. In the same or other embodiments, each of the labeled datasets 184 may be associated with multiple labels 194 and/or overlap with any number (including none) of the other labeled datasets 184.

Generating a Labeled Dataset Based on Thresholds

FIG. 2 is an exemplary labeled dataset 184(1) generated by the feedback application 170 of FIG. 1, according to various embodiments. More precisely, FIG. 2 depicts an exemplary labeled dataset 184(1) that the feedback application 170 generates during a driving scenario 210 in which the vehicle 102 moves into a blind spot of a truck 220.

As depicted in the driving scenario 210, the vehicle 102 is initially at a relative position 230(1) that is behind the truck 220. A relative motion 240(1) that occurs when the vehicle 102 accelerates more rapidly than the truck 220 causes the vehicle 102 to enter a blind spot that is along the side of the truck 220. Subsequently, a relative motion 240(2) that occurs when the vehicle 102 again accelerates more rapidly than the truck 220 causes the vehicle 102 to move in front of the truck 220.

For explanatory purposes only, the user state 150 includes, without limitation, a fear level 250, the label 194(1) is fearful, the label criterion 174(1) is that the fear level 250 is greater than an upper fear threshold 252, and the baseline criterion 176(1) is that the fear level 250 is less than a lower fear threshold 254. A fear graph 260 depicts the fear level 250 along a time axis 270 that spans the time period during which the vehicle 102 transmits from the relative position 230(1) to the relative position 230(3). The fear graph 260 also depicts the upper fear threshold 252 and the lower fear threshold 254.

At an initial time that is denoted "T1," the current label 182 (not shown in FIG. 2) is equal to the empty label, the vehicle 102 is in the relative position 230(1), and the fear level 250 is below the lower fear threshold 254. As described previously herein in conjunction with FIG. 1, because the current label 182 is equal to the empty label, the feedback application 170 stores the user states 150, the vehicle states 168 and the self-driving actions 178 in the historical database 180 until the fear level 250 is greater than the upper fear threshold 252. As the relative motion 240(1) moves the vehicle 102 into the relative position 230(2) that lies in the blind spot of the truck 220, the user(s) exhibit increasing physiological signs of fear and, consequently, the fear level 250 gradually increases. At a time that is denoted "T2," the fear level 250 increases past the lower fear threshold 254, and at time that is denoted "T3," the fear level 250 increases past the upper fear threshold 252.

When the fear level 250 increases past the upper fear threshold 252 at the time T3, the feedback application 170 sets the current label 182 equal to the label 194(1) of fearful. The feedback application 170 also generates a new labeled dataset 184(1) that initially includes, without limitation, the label 194(1) of fearful, the vehicle states 168 for the time period from T2-T3 (inclusive), and the self-driving actions 178 for the time period from T2-T3 (inclusive).

As described previously herein in conjunction with FIG. 1, because the current label 182 is equal to the label 194(1), the feedback application 170 subsequently stores the vehicle states 168 and the self-driving actions 178 in the labeled dataset 184(1) until the fear level 250 decreases past the lower fear threshold 254. While the vehicle 102 is in the relative position 230(2), the fear level 250 remains higher than the upper fear threshold 252. As the relative motion 240(2) moves the vehicle 102 out of the blind spot of the truck 220 and into the relative position 230(3), the user(s) exhibit decreasing physiological signs of fear and, consequently, the fear level 250 gradually decreases. At a time that is denoted "T4," the fear level 250 decreases past the lower fear threshold 254.

At the time T4, the feedback application 170 adds the final labeled dataset 184(1) to the training database 196. As shown, the final labeled dataset 184(1) includes, without limitation, the label 194(1) of fearful, the vehicle states 168 for the time period from T2-T4 (inclusive), and the self-driving actions 178 for the time period from T2-T4 (inclusive). The feedback application 170 then sets the current label 182 equal to the empty label. Advantageously, in at least one embodiment, when the training application 198 subsequently re-trains the self-driving model 108 based on the labeled dataset 184(1), the self-driving model 108 learns to preferentially reduce the amount of time that the vehicle 102 spends in the proximity of blind spots of trucks.

Figure 3:
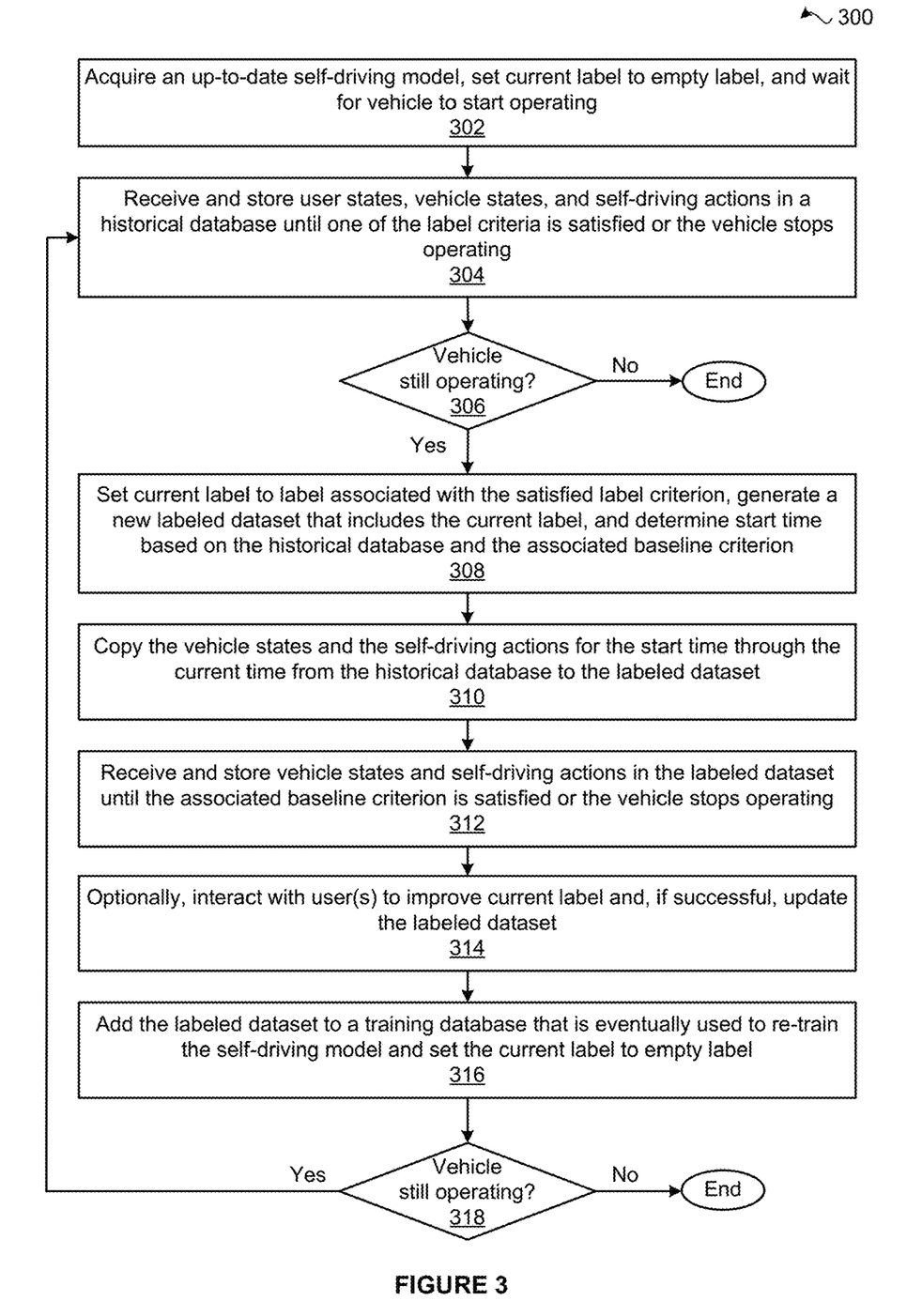
FIG. 3 is a flow diagram of method steps for modifying a self-driving model based on data associated with at least one user, according to various embodiments.

FIG. 3 is a flow diagram of method steps for modifying a self-driving model based on data associated with at least one user, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the self-driving application 104 acquires an up-to-date self-driving model 108 and waits for the vehicle 102 to start operating. At step 304, the feedback application 170 receives and stores the user states 150, the vehicle states 168, and the self-driving actions 178 in the historical database 180 until one of the label criteria 174 is satisfied or the vehicle 102 stops operating.

At step 306, the feedback application 170 determines whether the vehicle 102 is still operating. If, at step 306, the feedback application 170 determines that the vehicle 102 is no longer operating, then the method 300 terminates. If, however, at step 306, the feedback application 170 determines that the vehicle 102 is still operating, then the method 300 proceeds to step 308.

At step 308, the feedback application 170 sets the current label 182 equal to the label 194 associated with the satisfied label criterion 174, generates a new labeled dataset 184 that includes, without limitation, the current label 182, and determines a start time based on the historical database 180 and the baseline criterion 176 associated with the current label 182. At step 310, the feedback application 170 copies the vehicle states 168 and the self-driving actions 178 for the start time through the current time from the historical database 180 to the labeled dataset 184.

At step 312, the feedback application 170 receives and stores the vehicle states 168 and the self-driving actions 178 in the labeled dataset 184 until the baseline criterion 176 associated with the current label 182 is satisfied or the vehicle 102 stops operating. At step 314, the feedback application 170 optionally interacts with the user(s) to improve the current label 182 and, if successful, the feedback application 170 updates the labeled dataset 184 to include the improved label instead of the current label 182.

At step 316, the feedback application 170 adds the labeled dataset 184 to the training database 196 that is eventually used to re-train the self-driving model 108 and sets the current label 182 equal to the empty label. At step 318, the feedback application 170 determines whether the vehicle 102 is still operating. If, at step 318, the feedback application 170 determines that the vehicle 102 is no longer operating, then the method 300 terminates. If, however, at step 318, the feedback application 170 determines that the vehicle 102 is still operating, then the method 300 returns to step 304, where the feedback application 170 continues to generate labeled datasets 184 based on the user states 150, the vehicle states 168, and the self-driving actions 178 until the vehicle 102 ceases to operate.

In sum, the disclosed techniques may be used to improve the performance of a self-driving model. In one embodiment, a vehicle observation subsystem, a user monitoring subsystem, a self-driving application, and a feedback application execute while a vehicle operates. The vehicle observation subsystem generates a vehicle state based on data received from vehicle sensors and outward-facing sensors. The user monitoring subsystem generates a user state based on data received from user sensors. The self-driving application generates inputs for a self-driving model based on the vehicle state and the user state and, in response, the self-driving model generates self-driving actions. The self-driving application configures the vehicle to implement the self-driving actions, thereby controlling how the vehicle operates.

The feedback application generates labeled data based on the user state, the vehicle state, the self-driving actions, and any number of labels. Each label corresponds to a psychological characterization of at least one user, such as "fearful," and is associated with training the self-driving model. For each label, the feedback application evaluates the user states to identify any time periods during which the label is applicable. For each identified time period, the feedback application generates a new labeled dataset that includes, without limitation, the applicable label, the vehicle states associated with the tine period, and the self-driving actions associated with the time period. The feedback application transmits the new labeled datasets to a training database that a training application subsequently uses to re-train the self-driving model.

At least one technical advantage of the disclosed techniques relative to the prior art is that the feedback application uses measured physiological data to enable the training application to efficiently re-train a self-driving model to account for the impact different driving actions have on users. In particular, because the feedback application can automatically augment the training database based on driving scenarios that have negative psychological impacts on users, re-training the self-driving model can modify the self-driving model to disfavor driving actions that are associated with the identified driving scenarios that are likely to have negative psychological impacts on users. Furthermore, because the training application can re-train the self-driving model based on different training databases, the training application can automatically generate a different, personalized self-driving model for each of any number of users or groups of users. In this fashion, the feedback application and the training application can increase overall trust in self-driving systems across a wide variety of users. These technical advantages provide at least one technological advancement over prior art approaches.

1. In some embodiments, a computer-implemented method for modifying a self-driving model based on data associated with at least one user of a vehicle comprises computing at least one value for a psychological metric based on first sensor data that is associated with a user of the vehicle and is acquired while the self-driving model operates the vehicle, determining a description of the user over a first time period based on the at least one value for the psychological metric, generating a first dataset based on the description and second sensor data that is associated with the vehicle and is acquired over the first time period, and performing at least one machine learning operation on the self-driving model based on the first dataset to generate a modified self-driving model.

2. The computer-implemented method of clause 1, wherein the psychological metric is associated with at least one of an emotion or a cognitive load.

3. The computer-implemented method of clauses 1 or 2, wherein the first sensor data specifies at least one measurement of a body position, a body orientation, a head position, a head orientation, a gaze direction, a skin conductivity, or a neural activity for the user.

4. The computer-implemented method of any of clauses 1-3, wherein the second sensor data specifies at least one value for at least one of a brake pedal position of the vehicle, a speed of the vehicle, a lateral acceleration of the vehicle, a position of the vehicle, a direction of the vehicle, or an exterior scene image.

5. The computer-implemented method of any of clauses 1-4, wherein generating the first dataset comprises performing at least one tracking operation based on environmental data include in the second sensor data to generate tracking data associated with at least one object, and labelling the tracking data and at least one self-driving action generated by the self-driving model for the vehicle over the first time period with the description to generate the first dataset.

6. The computer-implemented method of any of clauses 1-5, wherein determining the description of the user comprises generating an initial description of the user over the first time period based on the at least one value for the psychological metric, transmitting first voice-based information derived from the initial description to the user, and generating the description based on second voice-based information received from the user.

7. The computer-implemented method of any of clauses 1-6, wherein the modified self-driving model is associated with the user and further comprising generating a second dataset based on third sensor data that is associated with a second user of a second vehicle and fourth sensor data that is associated with the second vehicle, wherein the third sensor data and the fourth sensor data are acquired while the self-driving model operates the second vehicle, and performing at least one machine learning operation on the self-driving model based on the second dataset to generate a second modified self-driving model that is associated with the second user.

8. The computer-implemented method of any of clauses 1-7, wherein determining the description of the user comprises determining that a first value included in the at least one value satisfies a first criterion associated with the description at a first time, and determining the first time period based on the first time and a second criterion associated with the description.

9. The computer-implemented method of any of clauses 1-8, wherein the user is seated in a driver seat of the vehicle or a passenger seat of the vehicle while the self-driving model operates the vehicle.

10. The computer-implemented method of any of clauses 1-9, wherein the vehicle comprises a car, a motorcycle, a bus, a commercial construction machine, an airplane, a helicopter, a boat, a submarine, an electric vertical takeoff and landing vehicle, or a spaceship.

11. In some embodiments, at least one non-transitory computer readable medium include instructions that, when executed by at least one processor, cause the at least one processor to modify a self-driving model based on data associated with at least one user of a vehicle by performing the steps of computing at least one value for a psychological metric based on first sensor data that is associated with a user of the vehicle and is acquired while the self-driving model operates the vehicle, determining a description of the user over a first time period based on the at least one value for the psychological metric, generating a first dataset based on the description and second sensor data that is associated with the vehicle and is acquired over the first time period, and performing at least one machine learning operation on the self-driving model based on the first dataset to generate a modified self-driving model.

12. The at least one non-transitory computer readable medium of clause 11, wherein computing the at least one value for the psychological metric comprises determining an emotion, a level of emotional valence, a level of emotional arousal, or a cognitive load based on the first sensor data.

13. The at least one non-transitory computer readable medium of clauses 11 or 12, wherein the first sensor data is received via at least one an electroencephalogram sensor, a heart rate sensor, a breathing sensor, a galvanic skin response sensor, a camera, or a microphone.

14. The at least one non-transitory computer readable medium of any of clauses 11-13, wherein the second sensor data specifies at least one of environmental data associated with the vehicle or telemetry data associated with the vehicle.

15. The at least one non-transitory computer readable medium of any of clauses 11-14, wherein generating the first dataset comprises performing at least one tracking operation based on environmental data include in the second sensor data to generate tracking data associated with at least one object, and labelling the tracking data and at least one self-driving action generated by the self-driving model for the vehicle over the first time period with the description to generate the first dataset.

16. The at least one non-transitory computer readable medium of any of clauses 11-15, wherein determining the description of the user comprises generating an initial description of the user over the first time period based on the at least one value for the psychological metric, transmitting first voice-based information derived from the initial description to the user, and generating the description based on second voice-based information received from the user.

17. The at least one non-transitory computer readable medium of any of clauses 11-16, further comprising generating a second dataset based on third sensor data that is associated with a second user of a second vehicle and fourth sensor data that is associated with the second vehicle, wherein the third sensor data and the fourth sensor data are acquired while the modified self-driving model operates the second vehicle, and performing at least one machine learning operation on the modified self-driving model based on the second dataset to generate a second modified self-driving model.

18. The at least one non-transitory computer readable medium of any of clauses 11-17, wherein determining the description of the user comprises determining that a first value included in the at least one value satisfies a first criterion associated with the description at a first time, and determining the first time period based on the first time and a second criterion associated with the description.

19. The at least one non-transitory computer readable medium of any of clauses 11-18, wherein the user is seated in a driver seat of the vehicle or a passenger seat of the vehicle while the self-driving model operates the vehicle.

20. In some embodiments, a system comprises at least one memory storing instructions, and at least one processor coupled to the at least one memory that, when executing the instructions, perform the steps of computing at least one value for a psychological metric based on first sensor data that is associated with a user of a vehicle and is acquired while a self-driving model operates the vehicle, determining a description of the user over a first time period based on the at least one value for the psychological metric, generating a dataset based on the description and second sensor data that is associated with the vehicle and is acquired over the first time period, and performing at least one machine learning operation on the self-driving model based on the dataset to generate a modified self-driving model.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for modifying a self-driving model configured to operate a vehicle, the method comprising:

computing one or more values for a psychological metric of a user of the vehicle based on first sensor data that is associated with the user, and is acquired while a self-driving application implementing the self-driving model operates the vehicle;

comparing the one or more values for the psychological metric with a first threshold for a first description to determine that the first description has been satisfied at a first time, wherein the first threshold is generated from data stored in a historical database;

comparing the one or more values for the psychological metric with a second threshold for the first description to determine that the first description is no longer satisfied at a second time, wherein the second threshold is different from the first threshold;

comparing the one or more values for the psychological metric with the second threshold for the first description to determine a third time at which the psychological metric exceeded the second threshold, wherein the third time precedes the first time and the second time;

identifying a defined time period between the third time and the second time;

generating a first labeled dataset for the user, the first labeled dataset including (i) the first description, (ii) second sensor data that is associated with the vehicle and is acquired over the defined time period, and (iii) a self-driving action performed by the vehicle during the defined time period;

adding the first labeled dataset to a training database to generate an updated training database; and re-training the self-driving model using the updated training database to generate a modified self-driving model.

2. The computer-implemented method of claim 1, wherein the psychological metric is associated with at least one of an emotion of the user or a cognitive load of the user.

3. The computer-implemented method of claim 1, wherein the first sensor data specifies at least one measurement of a body position, a body orientation, a head position, a head orientation, a gaze direction, a skin conductivity, or a neural activity for the user.

4. The computer-implemented method of claim 1, wherein the second sensor data specifies at least one value for at least one of a brake pedal position of the vehicle, a speed of the vehicle, a lateral acceleration of the vehicle, a position of the vehicle, a direction of the vehicle, or an exterior scene image.

5. The computer-implemented method of claim 1, wherein the step of generating the first labeled dataset comprises:
performing at least one tracking operation based on environmental data included in the second sensor data to generate tracking data associated with at least one object; and
substituting the tracking data for the second sensor data in the first labeled dataset.

6. The computer-implemented method of claim 1, wherein the step of determining the first description of the user comprises:
transmitting first voice-based information derived from the first description to the user; and
generating the first description based on second voice-based information received from the user.

7. The computer-implemented method of claim 1, wherein the modified self-driving model is associated with the user and further comprising:
generating a second labeled dataset based on:
third sensor data that is associated with a second user of a second vehicle, and
fourth sensor data that is associated with the second vehicle,
wherein the third sensor data and the fourth sensor data are acquired while the self-driving model operates the second vehicle;
adding the second labeled dataset to the updated training database to generate a second updated training database; and
re-training the self-driving model using the second updated training database to generate a second modified self-driving model that is associated with the second user.

8. The computer-implemented method of claim 1, wherein the user is seated in a driver seat of the vehicle or a passenger seat of the vehicle while the self-driving model operates the vehicle.

9. The computer-implemented method of claim 1, wherein the vehicle comprises a car, a motorcycle, a bus, a commercial construction machine, an airplane, a helicopter, a boat, a submarine, an electric vertical takeoff and landing vehicle, or a spaceship.

10. The computer-implemented method of claim 1, wherein the first threshold exceeds the second threshold.

11. One or more non-transitory computer readable media including instructions that, when executed by one or more processors, cause the one or more processors to modify a self-driving model configured to operate a vehicle by performing the steps of:
computing one or more values for a psychological metric of a user of the vehicle based on first sensor data that is associated with the user, and is acquired while a self-driving application implementing the self-driving model operates the vehicle;
comparing the one or more values for the psychological metric with a first threshold for a first description to determine that the first description has been satisfied at a first time, wherein the first threshold is generated from data stored in a historical database;
comparing the one or more values for the psychological metric with a second threshold for the first description to determine that the first description is no longer satisfied at a second time, wherein the second threshold is different from the first threshold;
comparing the one or more values for the psychological metric with the second threshold for the first description to determine a third time at which the psychological metric exceeded the second threshold, wherein the third time precedes the first time and the second time;
identifying a defined time period between the third time and the second time;
generating a first labeled dataset for the user, the first labeled dataset including
(i) the first description,
(ii) second sensor data that is associated with the vehicle and is acquired over the defined time period, and
(iii) a self-driving action performed by the vehicle during the defined time period;
adding the first labeled dataset to a training database to generate an updated training database; and
re-training the self-driving model using the updated training database to generate a modified self-driving model.

12. The one or more non-transitory computer readable media of claim 11, wherein the step of computing the one or more values for the psychological metric comprises determining, for the user based on the first sensor data, an emotion, a cognitive load, a level of emotional valence, or a level of emotional arousal.

13. The one or more non-transitory computer readable media of claim 11, wherein the first sensor data is received via at least one of an electroencephalogram sensor, a heart rate sensor, a breathing sensor, a galvanic skin response sensor, a camera, or a microphone.

14. The one or more non-transitory computer readable media of claim 11, wherein the second sensor data specifies at least one of environmental data associated with the vehicle, or telemetry data associated with the vehicle.

15. The one or more non-transitory computer readable media of claim 11, wherein the step of generating the first labeled dataset comprises:
performing at least one tracking operation based on environmental data included in the second sensor data to generate tracking data associated with at least one object; and
substituting the tracking data for the second sensor data in the first labeled dataset.

16. The one or more non-transitory computer readable media of claim 11, wherein the step of determining the first description of the user comprises:
transmitting first voice-based information derived from the first description to the user; and
generating the first description based on second voice-based information received from the user.

17. The one or more non-transitory computer readable media of claim 11, further comprising:
generating a second labeled dataset based on:
third sensor data that is associated with a second user of a second vehicle, and fourth sensor data that is associated with the second vehicle,
wherein the third sensor data and the fourth sensor data are acquired while the self-driving model operates the second vehicle;
adding the second labeled dataset to the updated training database to generate a second updated training database; and
re-training the self-driving model using the second updated training database to generate a second modified self-driving model that is associated with the second user.

18. The one or more non-transitory computer readable media of claim 11, wherein the user is seated in a driver seat of the vehicle or a passenger seat of the vehicle while the self-driving model operates the vehicle.

19. A system, comprising:
at least one memory storing instructions; and
at least one processor coupled to the at least one memory that, when executing the instructions, modify a self-driving model configured to operate a vehicle by performing the steps of:
computing one or more values for a psychological metric of a user of the vehicle based on first sensor data that is associated with the user, and is acquired while a self-driving application implementing the self-driving model operates the vehicle;
comparing the one or more values for the psychological metric with a first threshold for a first description to determine that the first description has been satisfied at a first time, wherein the first threshold is generated from data stored in a historical database;
comparing the one or more values for the psychological metric with a second threshold for the first description to determine that the first description is no longer satisfied at a second time, wherein the second threshold is different from the first threshold;
comparing the one or more values for the psychological metric with the second threshold for the first description to determine a third time at which the psychological metric exceeded the second threshold, wherein the third time precedes the first time and the second time;
identifying a defined time period between the third time and the second time;
generating a first labeled dataset for the user, the first labeled dataset including (i) the first description, (ii) second sensor data that is associated with the vehicle and is acquired over the defined time period, and (iii) a self-driving action performed by the vehicle during the defined time period;
adding the first labeled dataset to a training database to generate an updated training database; and
re-training the self-driving model using the updated training database to generate a modified self-driving model.

* * * * *